United States Patent
Chu

(10) Patent No.: US 11,714,630 B2
(45) Date of Patent: Aug. 1, 2023

(54) METHOD OF ADDING A SENSOR MONITORING FEATURE OF A NEWLY-ADDED SENSOR TO A SYSTEM MONITORING FEATURE PROVIDED BY A BASEBOARD MANAGEMENT CONTROLLER

(71) Applicant: MITAC COMPUTING TECHNOLOGY CORPORATION, Taoyuan (TW)

(72) Inventor: Hsin-Hao Chu, Taoyuan (TW)

(73) Assignee: MITAC COMPUTING TECHNOLOGY CORPORATION, Taoyuan (TW)

( * ) Notice: Subject to any disclaimer, the term of this patent is extended or adjusted under 35 U.S.C. 154(b) by 0 days.

(21) Appl. No.: 17/239,283

(22) Filed: Apr. 23, 2021

(65) Prior Publication Data
US 2021/0334086 A1  Oct. 28, 2021

(30) Foreign Application Priority Data
Apr. 27, 2020 (TW) .................. 109114008

(51) Int. Cl.
*G06F 8/65* (2018.01)
*G06F 11/30* (2006.01)

(52) U.S. Cl.
CPC ............ *G06F 8/65* (2013.01); *G06F 11/3058* (2013.01)

(58) Field of Classification Search
None
See application file for complete search history.

(56) References Cited

U.S. PATENT DOCUMENTS

| 6,496,790 | B1 * | 12/2002 | Kathavate | ............ | G01R 31/317 |
| | | | | | 702/188 |
| 8,812,137 | B2 * | 8/2014 | Koehler | .................. | G01D 3/08 |
| | | | | | 700/20 |
| 9,176,649 | B2 * | 11/2015 | Ayanam | .................. | G10L 15/22 |
| 9,311,486 | B2 * | 4/2016 | Ayanam | ................ | G06F 21/572 |
| 9,563,379 | B1 * | 2/2017 | Nichols | ................ | G06F 9/4401 |
| 10,120,676 | B2 * | 11/2018 | Su | ........................ | G06F 9/4411 |

(Continued)

FOREIGN PATENT DOCUMENTS

WO  WO-2020019724 A1 *  1/2020  ........... H04L 67/025

OTHER PUBLICATIONS

"IPMI—Intelligent Platform Management Interface Specification Second Generation v.2.0" Rev 1.1 Oct. 1, 2013. Available at < https://www.intel.com/content/dam/www/public/us/en/documents/product-briefs/ipmi-second-gen-interface-spec-v2-rev1-1.pdf> (Year: 2013).*

*Primary Examiner* — Matthew J Brophy
(74) *Attorney, Agent, or Firm* — Lewis Roca Rothgerber Christie LLP

(57) ABSTRACT

A method is provided for adding a sensor monitoring feature of a newly-added sensor to a system monitoring feature provided by a baseboard management controller (BMC). The BMC stores a BMC firmware that contains a main program, a sensor library and a sensor data record. The BMC updates the sensor library to a target sensor library that includes identification information of the additional sensor, and functions used to execute the sensor monitoring feature of the additional sensor. By executing the main program, the BMC loads the target sensor library, and adds the identification information of the additional sensor to the sensor data record.

14 Claims, 3 Drawing Sheets

(56) References Cited

U.S. PATENT DOCUMENTS

| | | | |
|---|---|---|---|
| 10,346,187 B1* | 7/2019 | Trier | G06F 9/455 |
| 10,924,350 B1* | 2/2021 | Kaminski | H04L 41/0896 |
| 11,635,971 B2* | 4/2023 | Amin | G06F 9/4406 |
| | | | 713/2 |
| 2004/0249913 A1* | 12/2004 | Kaufman, Jr. | G06F 11/3006 |
| | | | 714/E11.207 |
| 2005/0137833 A1* | 6/2005 | Sistla | G05B 23/0213 |
| | | | 702/188 |
| 2006/0167919 A1* | 7/2006 | Hsieh | G06F 11/3664 |
| 2008/0126586 A1* | 5/2008 | Shih | G06F 9/4411 |
| | | | 710/10 |
| 2008/0155300 A1* | 6/2008 | Yang | G06F 9/44505 |
| | | | 714/1 |
| 2008/0189315 A1* | 8/2008 | Shih | G06F 11/3089 |
| | | | 707/999.102 |
| 2012/0110389 A1* | 5/2012 | Chen | H04L 43/0817 |
| | | | 714/47.1 |
| 2012/0151007 A1* | 6/2012 | Mescher | G06F 11/3051 |
| | | | 709/219 |
| 2014/0195794 A1* | 7/2014 | Luo | G06F 8/654 |
| | | | 713/100 |
| 2014/0280837 A1* | 9/2014 | Ayanam | H04L 43/0817 |
| | | | 709/223 |
| 2015/0127814 A1* | 5/2015 | Hu | H04L 41/0661 |
| | | | 709/224 |
| 2016/0011887 A1* | 1/2016 | Chung | G06F 8/654 |
| | | | 713/2 |
| 2016/0283424 A1* | 9/2016 | Richardson | G06F 11/3058 |
| 2017/0003956 A1* | 1/2017 | Chang | G06F 8/658 |
| 2017/0109235 A1* | 4/2017 | Hung | G06F 11/1451 |
| 2018/0074984 A1* | 3/2018 | Olarig | G06F 13/36 |
| 2018/0107470 A1* | 4/2018 | Remis | G06F 8/65 |
| 2018/0107476 A1* | 4/2018 | Remis | G06F 8/658 |
| 2018/0121656 A1* | 5/2018 | Scherer, III | G06F 11/1469 |
| 2018/0210724 A1* | 7/2018 | Su | G06F 8/65 |
| 2020/0327009 A1* | 10/2020 | Callison | H04Q 9/04 |
| 2021/0141646 A1* | 5/2021 | Amin | G06F 9/4416 |
| 2022/0114066 A1* | 4/2022 | Gupta | G06F 9/4401 |

* cited by examiner

METHOD OF ADDING A SENSOR MONITORING FEATURE OF A NEWLY-ADDED SENSOR TO A SYSTEM MONITORING FEATURE PROVIDED BY A BASEBOARD MANAGEMENT CONTROLLER

CROSS-REFERENCE TO RELATED APPLICATION

This application claims priority of Taiwanese Invention Patent Application No. 109114008, filed on Apr. 27, 2020.

FIELD

The disclosure relates to a method for collecting information of operation conditions of a computer device, and more particularly to a method of adding a sensor monitoring feature of a newly-added sensor to a system monitoring feature provided by a baseboard management controller.

BACKGROUND

One of the main functions of a baseboard management controller (BMC) in a computer device is to collect information about the operation of the computer device and system status, such as system voltage, temperature, and fan speed. In practice, customers who purchased such a computer device may need the BMC to support new expansion cards, such as PCIE/OCP add-on cards, so the computer device can provide more services. In such a case, additional sensors may be required to monitor the voltage and the temperature of the new expansion cards, and the monitoring features (or functionalities) of the sensors have to be added to the monitoring feature (or functionality) provided by the BMC that is included in the computer device. In this case, the manufacturer must first define the sensor information in a main program of the BMC firmware, recompile the modified main program when the BMC firmware is generated, re-burn the BMC firmware, and reboot the BMC, to then finally be able to obtain information sensed by the new sensors via the BMC. However, during the burning and rebooting process, which may take a few minutes, the BMC is unable to provide services and there is even a risk of burning failure, which is not allowed in systems that require high availability.

In addition, under the current firmware release procedure, the recompiled BMC firmware has to be verified by a testing team before it can be released to the customer, which is not time-efficient.

SUMMARY

Therefore, an object of the disclosure is to provide a method that can dynamically add a sensor monitoring feature of a newly-added sensor to a system monitoring feature. The proposed method does not require re-burning of the BMC firmware and the rebooting of the BMC that follows, thereby reducing time required for releasing the BMC firmware update and achieving cost reduction.

According to the disclosure, the method is provided for adding a sensor monitoring feature of at least one additional sensor that is newly installed in a computer device to a system monitoring feature that is provided by a BMC. The BMC is included in the computer device, and stores a BMC firmware that contains a main program, a sensor library and a sensor data record. The method is implemented by the BMC, and includes steps of: A) updating the sensor library to a target sensor library that includes identification information of the at least one additional sensor, and functions used to execute the sensor monitoring feature of the at least one additional sensor, each of the functions being a sequence of program instructions that is configured to perform a specific task; B) loading the target sensor library by executing the main program; C) determining, by executing the main program, whether the sensor data record already has the identification information of the at least one additional sensor; D) upon determining that the sensor data record does not have the identification information of the at least one additional sensor in step C), adding the identification information of the at least one additional sensor to the sensor data record by using the main program to call a first function that is stored in the target sensor library and that is related to the at least one additional sensor; and E) initializing function variables that are stored in the target sensor library and that are related to the at least one additional sensor by using the main program to call a second function that is stored in the target sensor library and that is related to the at least one additional sensor.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
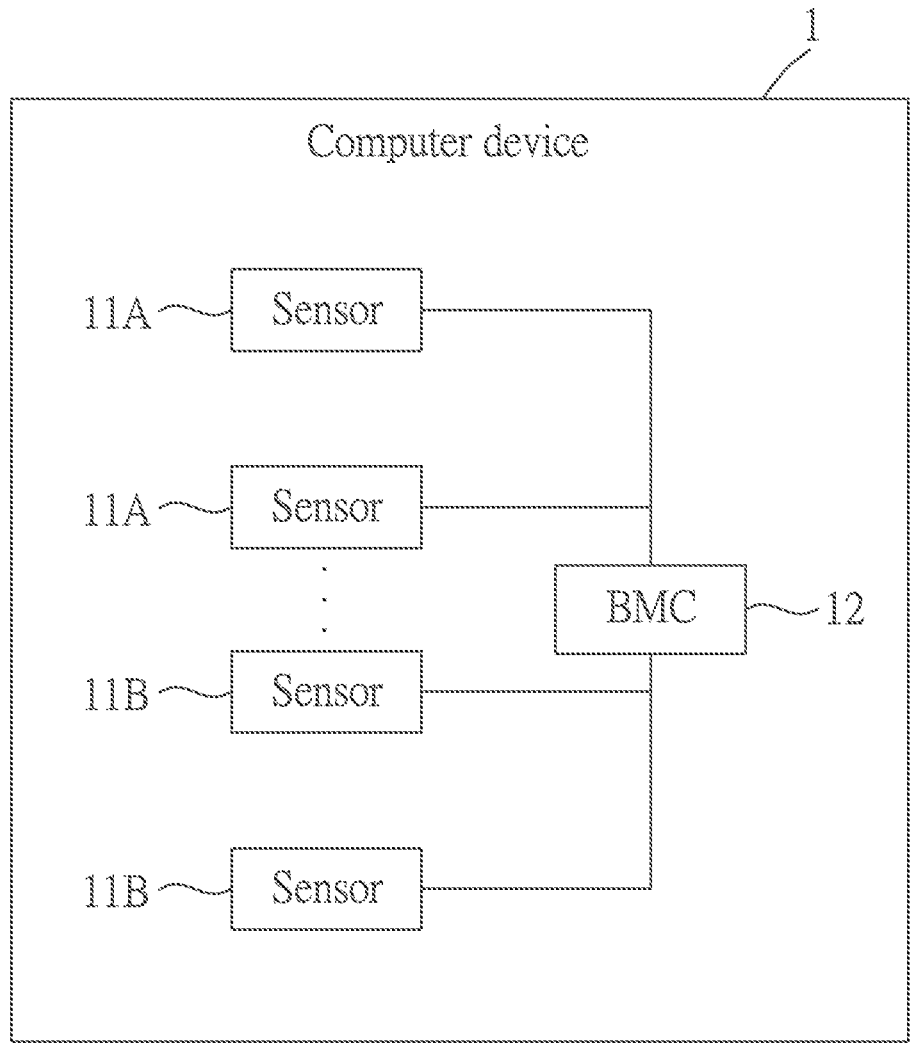
FIG. 1 is a block diagram illustrating a computer device to which an embodiment of a method according to this disclosure is applied, wherein the method is adapted for adding a sensor monitoring feature of a newly-added sensor to a system monitoring feature.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
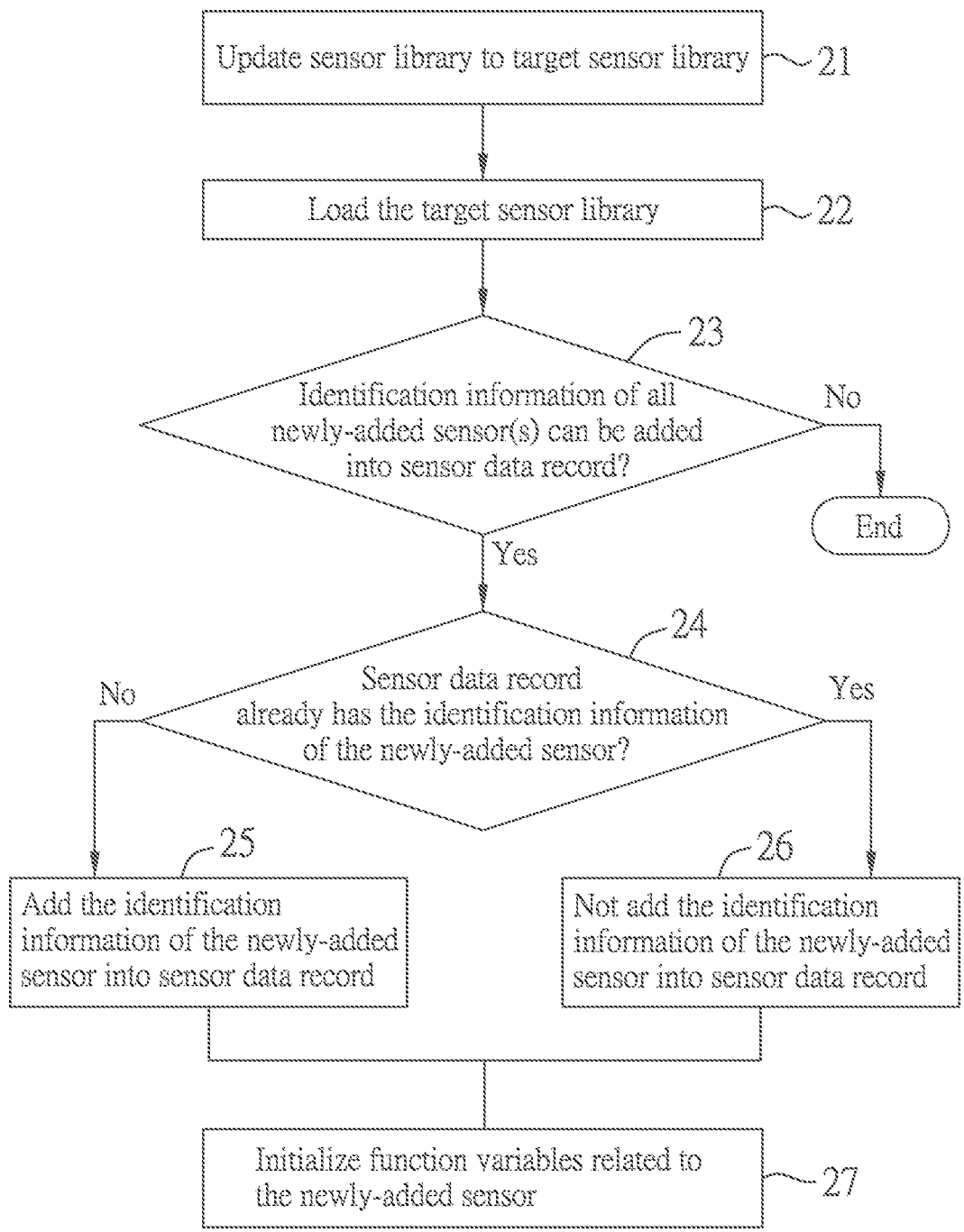
FIG. 2 is a flow chart illustrating steps of the embodiment.

Referring to FIGS. 1 and 2, an embodiment of a method according to this disclosure is provided for adding a sensor monitoring feature (or functionality) of at least one additional sensor 11B (or, newly-added sensor) that is newly installed in a computer device 1 to a system monitoring feature (or functionality) provided by a baseboard management controller (BMC) 12 of the computer device 1. In the illustrative embodiment, the computer device 1 is exemplified to include multiple sensors 11A that are originally installed in the computer device 1 and multiple additional sensors 11B that are newly installed in the computer device 1. In some embodiments, a number of the sensors 11A may be zero or one, and a number of the additional sensors may be one, but this disclosure is not limited in this respect. Each of the sensors 11A and 11B is used to monitor a component (not shown) of the computer device 1. The BMC 12 of the computer device 1 is electrically connected to the sensors 11A and 11B, and stores a BMC firmware that contains a main program, a sensor library and a sensor data record. The embodiment of the method according to this disclosure includes steps 21-27.

In step 21, the BMC 12 updates the sensor library stored therein to a target sensor library that includes identification information of each of the additional sensors 11B, and functions (program routines or subroutines, each being a sequence of program instructions that performs a specific task and that is packaged as a unit) used to execute the sensor monitoring features of the additional sensors 11B. For each of the additional sensors 11B, the functions may include, for example but not limited to, a create function "CreateSensor" configured to define the sensor monitoring feature of the additional sensor 11B in the BMC firmware, and an initializing function "InitSensor( )" configured to initialize the additional sensor 11B. In some embodiments, for each of the additional sensors 11B, the corresponding identification information and functions may be defined by an administrator.

In step 22, the BMC 12 loads the target sensor library by executing the main program. In some embodiments, the BMC 12 executes the main program every time the BMC 12 is booted. Every time when the BMC 12 is powered on, the BMC 12 may automatically execute the main program. When collecting information of operation conditions and system status of the computer 1, the BMC 12 will load the target sensor library by executing the main program. Along with the loading of the target sensor library, the functions of the additional sensors 11B are also loaded even if they are not included in the main program. In some embodiments, the BMC 12 executes the main program to load the target sensor library in response to an original equipment manufacturer (OEM) command received thereby, so the target sensor library can be loaded once the sensor library stored in the BMC 12 is updated to the target sensor library. In some embodiments, every time the BMC 12 is rebooted, the BMC 12 will automatically re-execute the main program to reload the target sensor library during the booting process of the BMC 12, so the OEM command is not necessary for loading the updated sensor library (i.e., the target sensor library). In other words, rebooting the BMC 12 can also allow the updated sensor library to be loaded.

In step 23, the BMC 12 determines, by executing the main program and based on the number of the additional sensors 11B, whether the identification information of every single one of the additional sensors 11B is allowed to be added to the sensor data record. When the BMC 12 determines that not the identification information of every single one of the additional sensors 11B is allowed to be added to the sensor data record, the flow ends. When the BMC 12 determines that the identification information of every single one of the additional sensors 11B is allowed to be added to the sensor data record, the flow goes to step 24.

Figure 3:
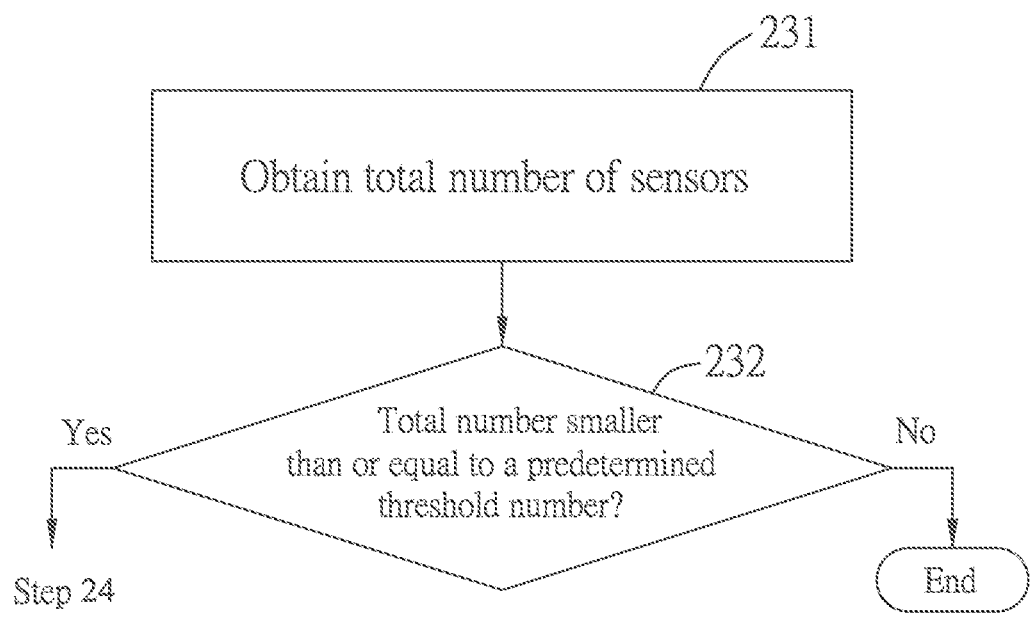
FIG. 3 is a flow chart illustrating sub-steps of step 23 shown in FIG. 2.

Referring to FIG. 3, step 23 includes sub-step 231 and 232.

In sub-step 231, the BMC 12 obtains a total number of sensors 11A, 11B with reference to the target sensor library and the sensor data record by executing the main program. In practice, the sensor data record records the identification information of the sensors 11A, and the target sensor library contains the identification information of the additional sensors 11B, so the BMC 12 can obtain the number (first sensor number) of the sensors 11A from the sensor data record, and obtain the number (second sensor number) of the additional sensors 11B from the target sensor library. Then, the BMC 12 adds the first sensor number and the second sensor number together to obtain the total number of sensors 11A, 11B.

In sub-step 232, the BMC 12 determines whether the identification information of every single one of the additional sensors 11B is allowed to be added to the sensor data record by comparing the total number of sensors with a predetermined threshold number. When the total number of sensors is greater than the predetermined threshold number, the BMC 12 determines that not the identification information of every single one of the additional sensors 11B is allowed to be added to the sensor data record, and the flow ends, where the sensor data record remains unchanged. When the total number of sensors is smaller than or equal to the predetermined threshold number, the BMC 12 determines that the identification information of every single one of the additional sensors 11B is allowed to be added to the sensor data record, and the flow goes to step 24.

Steps 24-26 are performed with respect to each of the additional sensors 11B. In step 24, for the additional sensor 11B, the BMC 12 determines, by executing the main program, whether the sensor data record already has the identification information of the additional sensor 11B. When the BMC 12 determines that the sensor data record does not have the identification information of the additional sensor 11B, the flow goes to step 25. When the BMC 12 determines that the sensor data record already has the identification information of the additional sensor 11B, the flow goes to step 26.

In step 25, the BMC 12 adds the identification information of the additional sensor 11B to the sensor data record by using the main program to call the create function "CreateSensor( )" that is stored in the target sensor library and that is related to the additional sensor 11B.

In step 26, the BMC 12 does not add the identification information of the additional sensor 11B to the sensor data record, and maintains the sensor data record to be unchanged.

In step 27, for each of the additional sensors 11B, the BMC 12 initializes function variables that are stored in the target sensor library and that are related to the additional sensor 11B by using the main program to call the initializing function "InitSensor( )" that is stored in the target sensor library and that is related to the additional sensor 11B. After the identification information of each of the sensors 11A, 11B has been recorded in the sensor data record and after the initialization for each of the sensors 11A, 11B has completed, the BMC 12 can, for each of the sensors 11A, 11B, make use of the functions that correspond to the sensor 11A or 11B and that has been loaded by the BMC 12 according to the identification information of the sensor 11A or 11B, so as to collect information monitored by the sensor 11A or 11B.

In some embodiments, in step 22, the BMC 12 triggers the main program to create a task to perform steps 23 and 24 in response to the OEM command received thereby, and uses the task created by the main program to call the create function and the initializing function that are related to the additional sensor 11B to perform steps 25 and 27, respectively. In some embodiments, the execution of steps 23, 24, 25 and 27 may be directly defined in a function (program routine or subroutine) of the main program without creating a task. However, the disclosure is not limited in this respect.

In summary, the embodiment of this disclosure dynamically adds the identification information of the newly-added sensor(s) 11B to the sensor data record by updating the sensor library to the target sensor library, loading the updated sensor library, and calling the updated sensor library by executing the main program, so as to dynamically load the functions of each of the sensors 11A and 11B. After initializing the function variables that are related to the sensors 11A, 11B, the BMC 12 can thus obtain the information sensed by each of the sensors 11A, 11B according to the corresponding function and the identification information. Since the identification information and the functions of each of the newly-added sensors 11B are defined in the target sensor library, the addition of the identification information and the functions of the newly-added sensors 11B only requires updating of the sensor library to the target sensor library, and the re-compiling of the main program is not necessary. As a result, re-burning the BMC firmware and the subsequent rebooting of the BMC 12 are not required, and the risk of burning failure can thus be avoided. Further, the testing team only needs to focus on verification of the target sensor library, so the time required for the verification process can be reduced, thereby shortening the time required for releasing the firmware update and thus achieving cost reduction.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method of adding a sensor monitoring feature of at least one additional sensor that is newly installed in a computer device to a system monitoring feature that is provided by a baseboard management controller (BMC), the BMC being included in the computer device and storing a BMC firmware that contains a main program, a sensor library and a sensor data record, said method being implemented by the BMC and comprising steps of:
A) updating the sensor library to a target sensor library that includes identification information of the at least one additional sensor, and functions used to execute the sensor monitoring feature of the at least one additional sensor, each of the functions being a sequence of program instructions that is configured to perform a specific task;
B) loading the target sensor library by executing the main program;
C) determining, by executing the main program, whether the sensor data record already has the identification information of the at least one additional sensor;
D) upon determining that the sensor data record does not have the identification information of the at least one additional sensor in step C), adding the identification information of the at least one additional sensor to the sensor data record by using the main program to call a first function that is stored in the target sensor library and that is related to the at least one additional sensor; and
E) initializing function variables that are stored in the target sensor library and that are related to the at least one additional sensor by using the main program to call a second function that is stored in the target sensor library and that is related to the at least one additional sensor,
the method further comprising, between steps B) and C), a step of: F) determining, by executing the main program and based on a number of the at least one additional sensor, whether the identification information of every single one of the at least one additional sensor is allowed to be added to the sensor data record;
wherein step C) is performed only when it is determined in step F) that the identification information of every single one of the at least one additional sensor is allowed to be added to the sensor data record;
wherein the method does not include rebooting the BMC; and
wherein the method does not include re-burning the BMC firmware.

2. The method of claim 1, wherein the first function is a create function configured to define the sensor monitoring feature of the at least one additional sensor in the BMC firmware, and the second function is an initializing function configured to initialize the at least one additional sensor.

3. The method of claim 1, further comprising a step of maintaining the sensor data record to be unchanged when it is determined in step C) that the sensor data record already has the identification information of the at least one additional sensor.

4. The method of claim 1, wherein step F) includes sub-steps of:
F-1) obtaining a total number of sensors with reference to the target sensor library and the sensor data record; and
F-2) determining whether the identification information of each of the at least one additional sensor is allowed to be added to the sensor data record by comparing the total number of sensors with a predetermined threshold number.

5. The method of claim 4, wherein sub-step F-1) includes:
obtaining, from the sensor data record, a first sensor number which is number of sensors that are already recorded in the sensor data record;
obtaining, from the target sensor library, a second sensor number which is the number of the at least one additional sensor; and
adding the first sensor number and the second sensor number together to obtain the total number of sensors.

6. The method of claim 4, wherein, in sub-step F-2), it is determined that not the identification information of every single one of the at least one additional sensor is allowed to be added to the sensor data record when the total number of sensors is greater than the predetermined threshold number, and that the identification information of every single one of the at least one additional sensor is allowed to be added to the sensor data record when otherwise.

7. The method of claim 4, further comprising:
upon determining in sub-step F-2) that not the identification information of every single one of the at least one additional sensor is allowed to be added to the sensor data record, maintaining the sensor data record to be unchanged.

8. The method of claim 1, wherein, in step B), the BMC executes the main program to load the target sensor library in response to an original equipment manufacturer (OEM) command received thereby.

9. The method of claim 8, wherein step B) includes triggering the main program to create a task in response to the OEM command;
wherein, in step D), the BMC uses the task created by the main program to call the first function; and
wherein, in step E), the BMC uses the task created by the main program to call the second function.

10. The method of claim 9, wherein step C) is performed by executing the task created by the main program.

11. The method of claim 1, wherein, in step B), the BMC automatically executes the main program to load the target sensor library when the BMC is being powered on.

12. The method of claim 1, wherein, in step B), the BMC automatically executes the main program to load the target sensor library.

13. The method of claim 1, wherein the BMC performs steps D) and E) by executing a function of the main program.

14. The method of claim 1, wherein, in step B), the BMC loads the target sensor library in response to an original equipment manufacturer (OEM) command received thereby, step B) includes triggering the main program to create a task in response to the OEM command, and, in step C), the BMC uses the task created by the main program to call the first function.

* * * * *